Oct. 4, 1955  A. PIQUEREZ  2,719,605
LUBRICATOR FITTING
Filed Oct. 7, 1952
Fig. 1.
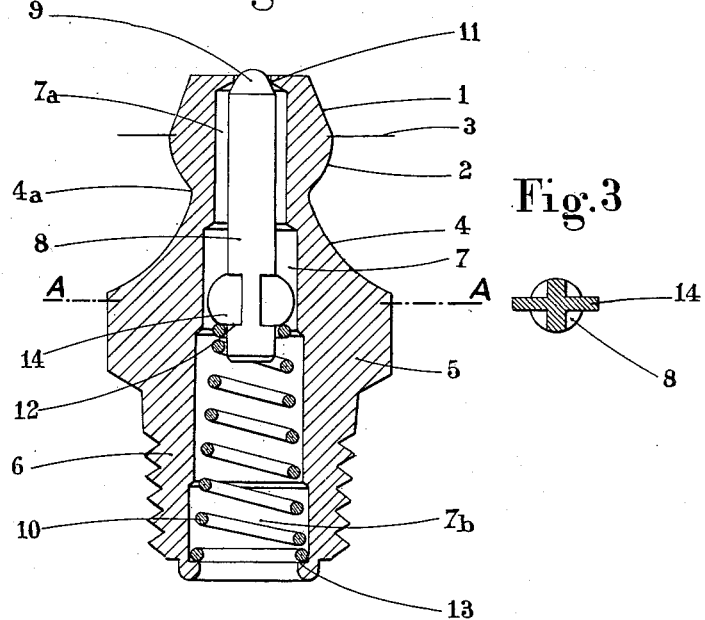
Fig. 3
Fig. 2.
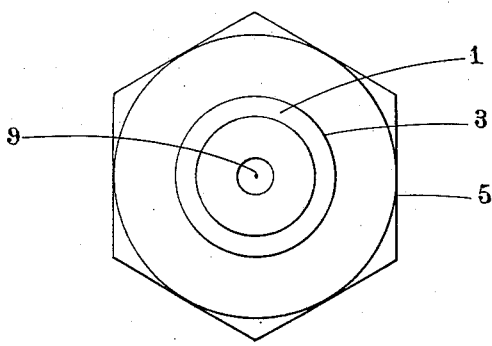
Inventor
Arthur Piquerez
By Robert E. Burns
Attorney

United States Patent Office 2,719,605
Patented Oct. 4, 1955

2,719,605

LUBRICATOR FITTING

Arthur Piquerez, Saint-Cloud, France, assignor to Societe dite: Tecalemit, Societe Anonyme, Paris, France Application October 7, 1952, Serial No. 313,421

Claims priority, application France October 22, 1951

1 Claim. (Cl. 184—105)

This invention has for its object a lubricator fitting suitable for use in high-pressure lubrication systems that can be manufactured in large quantities and at low cost on modern machine tools.

A difficulty which attends the production of a lubricator fitting provided with a non-return valve and more particularly of a small-diameter lubricator fitting is to satisfactorily close the end of the grease inlet duct.

In most of the known lubricator fittings said grease inlet duct is closed by means of a ball performing the function of a non-return valve and pressed into engagement with its seat by a spring; however, in lubricator fittings of very small size, it is practically impossible to arrange the ball in such a manner that the orifice of the duct is effectively closed, with the result that dust or like foreign matter is given an access into the free space left above the ball and that eventually it will be carried along up to the member to be lubricated by the grease forced in.

Thus, this invention is more particularly concerned with small-diameter lubricator fittings, that is, where it is most difficult to accommodate the non-return valve and the loading spring assigned thereto, and notably with lubricator fittings of the conventional type nearly all automobile chassis and a great many machines are equipped with presently.

The lubricator fitting of the type more particularly yet not exclusively referred to and which is formed with a thorough axial duct includes the following portions, starting from its grease intake end:

A nipple of comparatively small diameter which is designed in a well known manner to fit in and retain the union at the end of the grease supply line;

A middle portion of larger diameter formed with a transition neck portion and having e. g. a hexagonal section so as to afford a firm hold for a wrench in fixing the lubricator; last, A preferably screwthreaded tail portion to be rooted in the part to be lubricated.

A particular feature of this invention is that the non-return valve arranged in the axial duct is a needle the outer end of which is resiliently pressed into engagement with a seat machined from the inside in the corresponding end of the lubricator fitting; the shaft portion of the needle extends axially through the outer end portion of the duct, the bore of which is slightly larger than the diameter of the needle; towards the inner end of the needle same is formed or provided with a rest for a valve-loading coil spring the opposite end of which is rested on an inwardly projecting shoulder provided in the root end of the lubricator fitting.

The diameter of the duct in that portion of the same through which the needle extends is so related to the outer diameter of the nipple that the latter retains a sufficient strength, while the opposite end of the duct extends through an enlarged portion of the lubricator fitting and is preferably likewise enlarged, so as to facilitate the accommodation of the spring.

The outer end of the needle which performs the sealing function is so shaped that its end face is flush with the end face of the nipple in order that no appreciable recess is left in which dust could accumulate.

Further features and advantages of this invention will be set forth in the following specification of a preferred embodiment of the same, in which reference is had to the appended sheet of drawings.

In the drawings:

Figure 1 is an axial sectional view of the lubricator fitting.

Figure 2 is a top plan view of the same.

Figure 3 is a cross-sectional view of the valve needle taken on line A—A in Fig. 1.

The nipple of the lubricator fitting is designed in a manner known per se as a bossed frustum of a cone on the conical end 1 of which a union of likewise known design can be fitted the inner gripping claws of which are thereby progressively wedged apart while the spherical face 2 of the boss which extends below the equatorial circle 3 delimiting the frusto-conical from the spherical portion of the nipple provide a reliable rest for the claws against which they are kept firmly pressed by the pressure of the grease even if the union were not exactly collinear with the nipple.

The nipple 1—2 is transitioned by a neck portion 4 with a portion 5 of larger diameter which is designed to give a hold to a suitable tool used in fitting the lubricator fitting to the part to be lubricated. In the embodiment described and shown the said portion 5 has a hexagonal outline for convenience in using a wrench.

Next to the enlarged portion 5 the lubricator fitting is formed with a tail portion 6 which preferably is provided with an external thread for convenience in fixing the lubricator fitting to a machine part.

The axial duct 7 which extends through the lubricator fitting is bored so that maximum facilities are afforded in housing the non-return valve and the spring within the lubricator fitting.

According to this invention, the said non-return valve consists of a spindle 8 the outer end 9 of which is resiliently pressed by a spring 10 into engagement with a seat 11 machined from the inside in the corresponding end 1 of the nipple.

The inner diameter of the outer end 7a of the axial duct 7 through which projects the needle 8 is very slightly larger than that of the latter, although a sufficiently wide annular passageway is left therebetween for the grease to flow through.

The spring 10 is compressed between a shoulder 12 provided close to the inner end of the needle 8 and a further shoulder 13 provided in the root end of the lubricator fitting.

As shown in the drawing, said shoulder 12 consists of radially projecting lugs 14 stamped from the metal of the needle; it is to be understood that said shoulder may as well consist of a ring formed on or secured to the needle.

The inner diameter of the duct 7 in its outer end portion is likewise so related to the outer diameter of the nipple 1–2 that the latter remains sufficiently strong, notably in the choked portion 4a of the neck 4, while in the inner end portion of said duct same is larger in diameter for convenience in accommodating the spring 10.

What I claim is:

A lubricator fitting for the lubrication of machine parts with the aid of a forced lubrication junction provided with clamping jaws, said fitting including a nipple formed with an upper frusto-conical portion and a lower semi-spherical portion adapted to be clamped at various angles by the junction jaws, an enlarged portion solid with the nipple providing a downward extension of the same through a neck portion, an externally threaded tail portion extending said enlarged portion to be threaded into the part to be lubricated, said nipple being bored axially with a duct milled at the intake end thereof with a valve seat and extending through said enlarged portion down to a point below the neck portion and thence through an enlarged axial duct to an outlet orifice located at the end of the tail portion and formed with an inwardly projecting shoulder, a cylindrical spindle projecting through the first-mentioned duct and providing at the upper end thereof a valve cooperating with the aforesaid valve seat in the inlet of the nipple and having radial lugs at its lower end slidably guided in the aforesaid enlarged axial duct and a spring rested on the shoulder at the outlet of the tail portion and acting upon the radial lugs on the spindle to press the upper valve-forming end of the spindle into engagement with its seat in the intake orifice of the nipple.

References Cited in the file of this patent

UNITED STATES PATENTS

| | | |
|---|---|---|
| 2,025,229 | Dodge | Dec. 24, 1935 |
| 2,087,085 | Davis | July 13, 1937 |
| 2,431,769 | Parker | Dec. 2, 1947 |
| 2,454,252 | Heim | Nov. 16, 1948 |